Sept. 23, 1969  J. A. NELSON  3,468,389
PROPULSION UNITS FOR USE WITH ELECTRIC DRIVE VEHICLES
Filed May 9, 1967  2 Sheets-Sheet 1

INVENTOR.
JAMES A. NELSON
BY
HIS ATTORNEY

Sept. 23, 1969  J. A. NELSON  3,468,389
PROPULSION UNITS FOR USE WITH ELECTRIC DRIVE VEHICLES
Filed May 9, 1967  2 Sheets-Sheet 2

United States Patent Office 3,468,389
Patented Sept. 23, 1969

3,468,389
PROPULSION UNITS FOR USE WITH
ELECTRIC DRIVE VEHICLES
James A. Nelson, Erie, Pa., assignor to General Electric
Company, a corporation of New York
Filed May 9, 1967, Ser. No. 637,182
Int. Cl. B60k 1/00; B61c 9/24
U.S. Cl. 180—65                                   8 Claims

ABSTRACT OF THE DISCLOSURE

An electric vehicle propulsion unit wherein an axle drive gear unit is arranged about the axle of the vehicle and solidly couples driving power to the axle from gearing driven by an electric traction motor resiliently mounted at one end to the housing of the gear drive unit to provide a resilient mounting to support and take the torque reaction of the motor. A torque arm resiliently connectable between the gear unit and the vehicle frame takes the torque reaction of the gear unit and a resiliently connectable linkage means, which may include a vertically disposed link and a horizontally disposed link, is provided between the other end of the traction motor and the frame of the vehicle. When a vertical and horizontal link is utilized one link is arranged to exhibit stiffness in the vertical direction and flexibility in the horizontal plane and the other link is arranged to exhibit stiffness in a horizontal direction and flexibility in the vertical plane.

---

Figure 1:
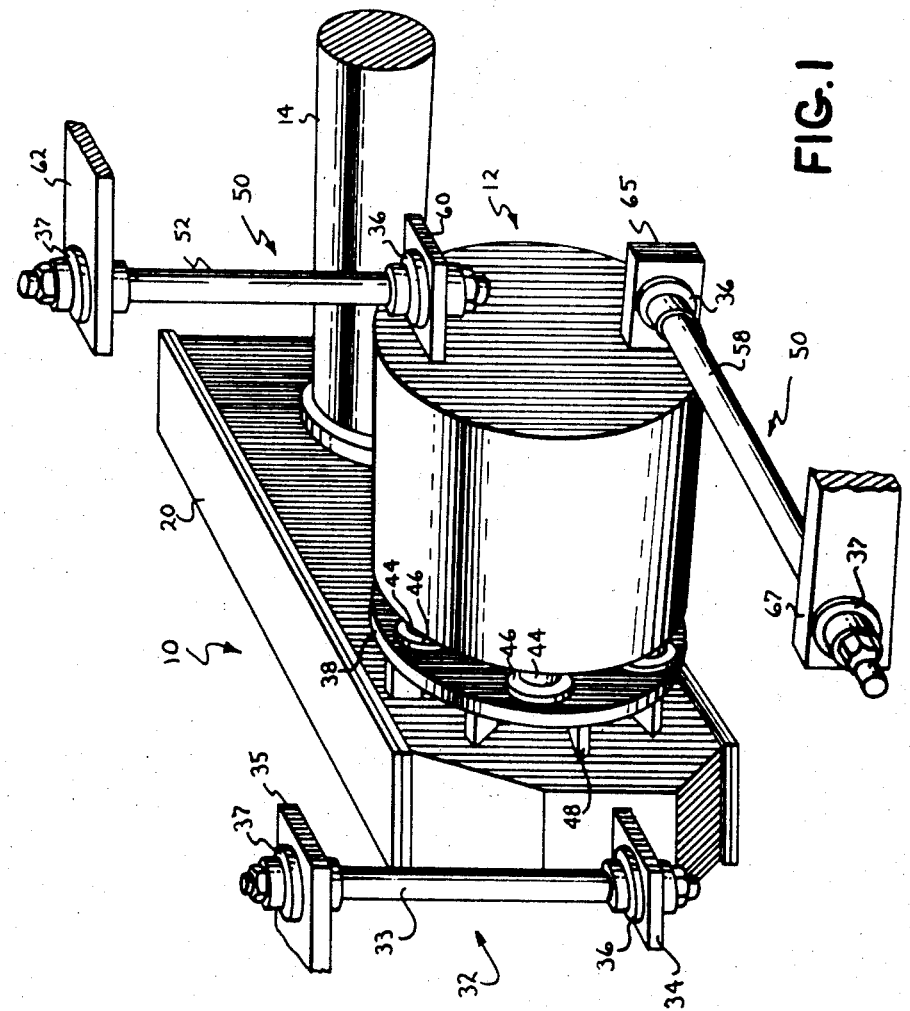

This invention relates to electric drive vehicle propulsion units of the type wherein an axle drive gear unit and an electric traction motor are combined into a single assembly. More particularly, the invention relates to a new and improved suspension system for a propulsion unit. Although this invention may be employed to advantage with propulsion units of various types and configurations, such as for example, right angle or parallel type drives, for use with a wide variety of vehicles, it is especially suitable for use in rail vehicle propulsion units of the parallel drive type and will be particularly described in that connection.

In one conventional type of rail vehicle parallel drive a gear housing positionable about the vehicle axle contains gearing through which drive is imparted to the axle from an electric traction motor rigidly mounted to the gear unit with the motor output shaft driving the gearing. In such prior arrangements, since the traction motor and gear drive unit form a rigid assembly, the entire assembly must be resiliently mounted to the axle and vehicle frame. In the conventional arrangement, the gear drive unit is provided with a main gear drivingly secured to a quill shaft which fits about the axle and is connected through rubber to the vehicle axle. The torque reaction of the driven axle is taken by a vertical link or torque arm connected resiliently between the gear unit and the vehicle frame.

While such prior arrangements had the advantage of providing a compact drive assembly, such units were not entirely satisfactory from the standpoint of operating lifetime and maintenance free operation for the desired extended periods of time. Also, due to the characteristics of the rubber which resiliently coupled the driving power to the axle, there was an inherent run-out in the arrangement. Moreover, the rubber coupling must be made sufficiently large to transmit the driving torque to the axle. That is, the rubber connection between the gear unit and the vehicle axle is subjected to the motor torque multiplied by the gear ratio of the unit. Any required replacement of this rubber coupling between the gear unit and the axle was difficult since a complete disassembly of the axle and wheels was required. Further, since in some such prior arrangements an internal coupling was employed and the traction motor inserted or plugged into a large opening provided in the gear unit, the gear unit was easily contaminated with wear particles from the coupling as well as with dirt from outside whenever the traction motor had to be removed for repair or replacement.

It is an object of this invention, therefore, to provide a new and improved propulsion unit which overcomes one or more of the prior art difficulties and one which is lightweight and simple.

It is another object of this invention to provide a drive propulsion unit which obviates the need for a resilient coupling between the gear unit and the vehicle axle while providing resilient cushioning and support for the traction motor.

It is a further object of the invention to provide a drive propulsion unit wherein repair or replacement of the resilient cushioning and support elements of the suspension system thereof may be readily accomplished.

It is a still further object of the invention to provide a new and improved suspension system for a propulsion unit which is capable of being resiliently adjustable to more readily overcome vibration problems.

Briefly stated, in accordance with one aspect of the invention, a new and improved suspension system is provided for an electric drive vehicle propulsion unit of the type having a combined traction motor and axle gear drive unit wherein driving power from the traction motor is delivered through the gearing of the gear unit and solidly coupled to an axle of the vehicle. A first linkage means is provided and arranged for connection resiliently to the gear unit to take the axle torque reaction thereof. Resilient means are provided interposed between the traction motor frame and the housing of the gear unit for resiliently supporting the traction motor and taking the torque reaction of the traction motor. Resilient means, such as a resiliently connectable linkage means, are provided near the end of the traction motor remote from the gear unit to provide a resilient support for the traction motor. Such resilient means may be arranged to include a resilient stabilizing device, such as a second resiliently connectable linkage means when desired, as well as the resilient supporting means.

Figure 2:
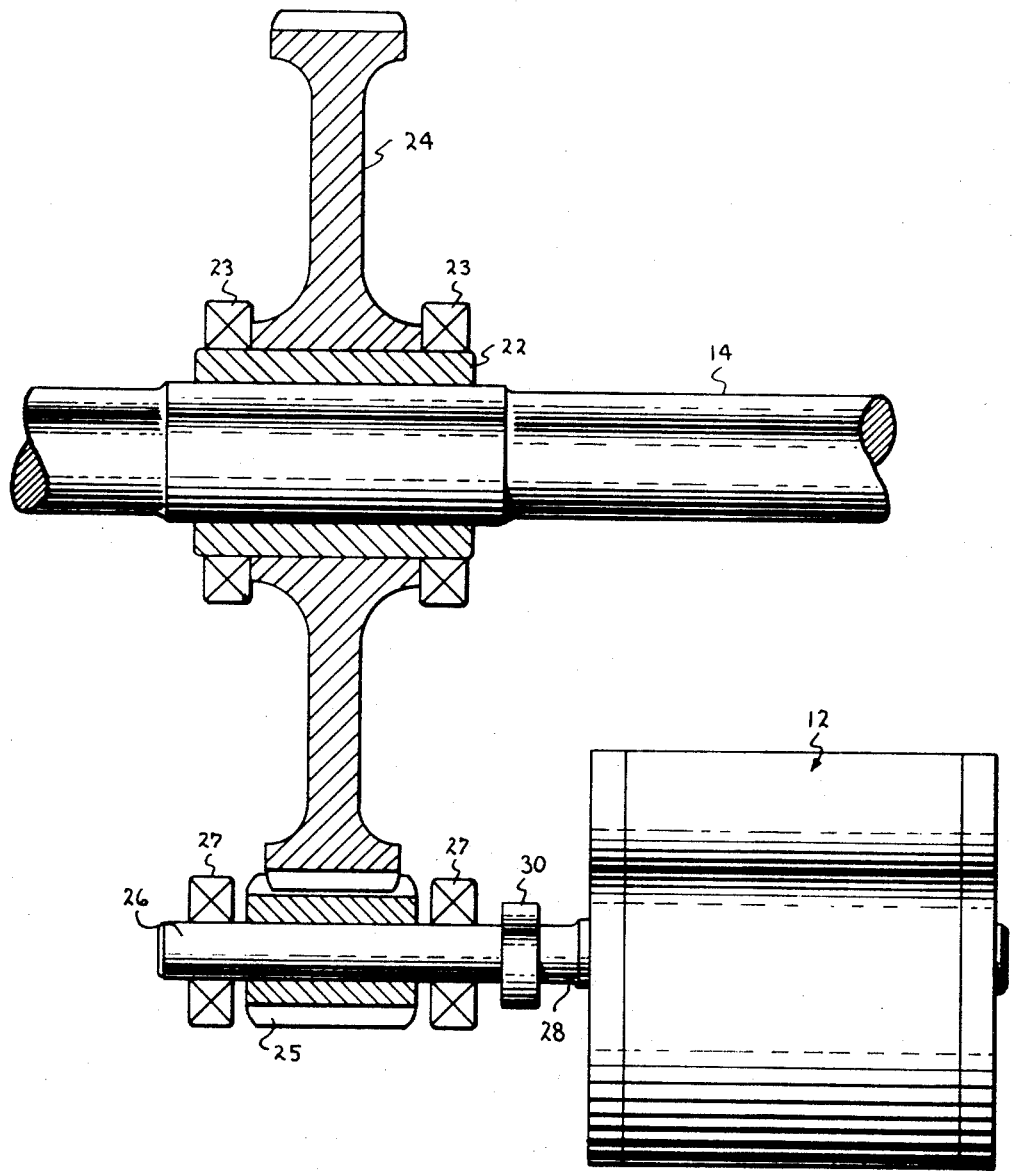

The novel features believed characteristic of the invention are set forth with particularity in the appended claims. The invention itself, however, together with its organization and method of operation as well as further objects and advantages thereof may best be understood by reference to the following description taken in connection with the accompanying drawings, in which:

FIG. 1 is a diagrammatic perspective type view of a propulsion unit in accordance with an embodiment of this invention; and FIG. 2 is a schematic representation illustrating a suitable gearing arrangement to provide for solidly coupling driving power to a vehicle axle.

Referring now to the drawing, there is shown a propulsion unit for an electrically propelled vehicle, such as a rail vehicle. The propulsion unit includes a gear drive unit 10 of the axle drive type and an electric traction motor 12 mounted thereto to provide a unitary assembly adapted for mounting between the wheels (not shown) of the vehicle and impart driving power from the traction motor to the axle 14 through the gearing of the gear unit, which gearing is driven by the traction motor. Because of the foregoing arrangement wherein the traction motor is positioned parallel with the axle which it drives, such propulsion units are often referred to in the art as "parallel drives."

Heretofore parallel drives included a traction motor rigidly mounted to the gear drive unit and with provision for resiliently mounting the gear unit to the vehicle axle. Usually the gear unit included a quill shaft, having the main or ring gear drivingly secured thereto. The quill shaft was adapted to fit about the vehicle axle and was attached thereto by rubber elements which not only resiliently mounted the gear unit to the axle but also served to transmit the torque from the gear unit to the axle. Thus, the driving power from the gear unit was resiliently coupled to the axle. The torque reaction of the gears was arranged to be taken by a torque arm or link fastened at one end to the housing of the gear unit and at the other end to the frame of the vehicle. Usually the ends of the torque rod were mounted through suitable rubber bushings for flexibility and absorbing shocks and vibrations.

As set forth hereinbefore, this prior arrangement was not entirely satisfactory especially from the standpoint of operating lifetime and maintenance free operation. The present invention, therefore, provides a new arrangement wherein the gear drive unit is solidly mounted to the vehicle axle with driving power being solidly coupled thereto but with the traction motor resiliently mounted and supported so as to take the torque reaction of the motor and be cushioned from the shocks and vibrations of the axle.

As used herein and in the appended claims, the term "solidly coupled" is intended to define a coupling or connection which provides for the transmission of torque through nonresilient means and includes couplings of the type known as flexible couplings wherein any resilient means employed is for the primary purpose of accommodating misalignment. The term, therefore, is intended to establish a clear distinction from the prior are arrangements of rubber or other resilient mountings through which torque is resiliently transmitted between the gear unit and the vehicle axle.

In the gear unit of the present invention the gearing, shown schematically in FIG. 2, is arranged so that the driving power is solidly coupled to the axle 14. The gear unit may be of any conventional construction the usual type including a housing 20 having a hollow or quill shaft 22 rotatably mounted therein on suitable bearings 23. A main or ring gear, shown as a helical gear 24, is press fit or otherwise drivingly secured to the quill shaft 22 and is arranged to be in constant mesh with other gearing thereof, shown as a pinion gear 25; pinion gear 25 being suitably drivingly secured to a shaft 26 also rotatably mounted in suitable bearings 27 in the housing 20 and having one end thereof extending therefrom for connection to the output shaft 28 of motor 12.

For simplicity, the gear unit will be shown and described as a single reduction unit, it being understood that further reduction may be readily provided by the use of additional gearing as is well known.

The quill shaft 22 is adapted to be press fit or otherwise drivingly secured to the vehicle axle 14 so that the driving power coupled to the gearing from traction motor 12 is solidly coupled to the axle. This solid coupling arrangement is shown in more detail by the schematic representation of FIG. 2. The output shaft 28 of the traction motor 12 is shown coupled through a suitable flexible coupling means 30 to the pinion gear shaft 26 to drive the gearing and impart the driving power of the traction motor through the gearing to the axle 14.

As shown in FIG. 1, the torque reaction of the gearing is taken in the usual manner by a suitable torque arm 32 one end of which is fastened to the housing 20 of the gear unit and the other end to a suitable support such as the vehicle frame. As shown, torque arm 32 includes a link 33 resiliently fastened to a sutiable lug 34 on the gear housing 20 through a pair of resilient bushing means, such as rubber pads 36 and 37, one disposed on either side of the mounting lug 34. The link 33 is adapted to be positioned vertically with respect to the vehicle, as shown, and has its other end similarly resiliently fastened through a pair of resilient bushings to the frame 35 or other suitable member of the vehicle.

In further accord with the present invention, the frame of the traction motor 12 is arranged to be resiliently mounted and supported from the gear unit and the vehicle frame so as to be cushioned and isolated from the shocks and vibrations of the vehicle axle to which the gear unit is solidly mounted. To this end, one end of the traction motor 12 is arranged to be mounted to the gear housing through resilient means and the other end thereof resiliently supported to the frame, or other suitable member, of the vehicle.

For the arrangement illustrated, one end of the gear housing 20 is provided with a suitable mounting means for the traction motor shown as an annular flange 38 having a plurality of circumferentially spaced mounting holes therein. The mounting holes are spaced to meet similar mounting holes arranged circumferentially about the end of the traction motor 12. Each of the mounting holes, provided respectively in the flange 38 and end of the traction motor, is adapted to receive suitable resilient bushing 46 to provide for a resilient mounting and support between the traction motor 12 and the gear housing 20. As shown, the annular flange 38 is mounted to the gear housing 20 by suitable members 48 to provide sufficient clearance between the flange and the housing to facilitate bolting or otherwise securely fasteneng the traction motor to the mounting flange. Also, sufficient space must be provided to allow for the coupling of the output shaft 28 of the traction motor to the pinion gear shaft 26 through a suitable flexible coupling means 30. (FIG. 2)

The resilient bushings 46 may be of any suitable type which will effect a resilient mounting between the traction motor and the gear housing and take the torque reaction of the motor. For example, the resilient bushings 46 should be stiff in the radial direction to withstand torque but flexible in the axial direction (with respect to the output shaft of the motor) to permit movement (i.e., bending). Since the torque reaction at this point is merely that of the traction motor itself, such torque reaction is small compared to the torque reaction after being multiplied by the gearing. Conveniently, the bushings 46 may be of the type including a hollow metal core 44 surrounded by resilient material, such as rubber. The mounting holes in the mounting means of either the motor or the gear housing are made large enough to snugly receive the surrounding resilient portion of the bushing. Conveniently, the resilient bushings may be positioned within the suitably provided mounting holes in the flange 38. Alternatively, some or all of the bushings may be positioned within suitably provided mounting holes of the traction motor mounting means. Also, the metal core of each of the bushings may conveniently extend beyond the mounting holes to butt tightly against each other mounting means when the gear unit and the traction motor are bolted or otherwise securely fastened together. When bolts are employed, such bolts would pass through the hollow metal core of the bushings with the desired resilent mouting and support being effected by the surrounding resilient material.

Alternatively, any other suitable resilient mounting means may be employed between the motor and the housing, such as for example, a continuous resilient member extending circumferentially around the mounting flange 38. Various other suitable resilient mounting arrangements will also occur readily to those skilled in the art and any of such means as are effective to provide a resilient mounting and support capable of taking the torque reaction of the traction motor and allow movement in the axial direction (with respect to the output shaft of the motor) may be employed.

In addition to the resilient mounting of the end of the traction motor to the gear housing, there is also provided a resilient support for the other end of the traction motor remote from the gear unit. As shown, this other end of the traction motor is supported to the frame, or other suitable member, of the vehicle by a linkage means, generally indicated by the reference numeral 50. Linkage means 50 may be a single resiliently connectable link, such as the link 52, positioned vertically between the end of the traction motor and the frame or other suitable member, of the vehicle and exhibiting stiffness in the vertical direction and flexibility in the horizontal plane or a single link positioned at a suitable angle to provide components of resilient support in directions both vertically and horizontally. Preferably, as illustrated, linkage means 50 includes both the resiliently connectable support link 52 positioned vertically between the end of the traction motor and the frame of the vehicle and a resiliently connectable stabilizing link 58 positioned horizontally with respect to the vehicle between the end of the traction motor and the frame of the vehicle. Preferably, stabilizing link 58 is positioned longitudinally with respect to the vehicle.

Conveniently, links 52 and 58 may be made similar to that of torque arm 32. Thus, as shown, a support link 52 is fastened at one end through the resilient elements 36 and 37 disposed on opposite sides of a mounting lug 60 extending from the end of the traction motor frame. The other end of the support link 52 is fastened through the similar resilient elements 36 and 37 disposed on opposite sides of a mounting member 62 extending from the frame, or other suitable member of the vehicle. Similarly, stabilizing link 58 is fastened through the resilient elements 36 and 37 disposed on opposite sides of the mounting lug 65 extending from the motor frame and at the other end through the resilient elements 36 and 37 to the mounting member 67 extending from the frame or other suitable member of the vehicle.

The link 52 and the resilient elements 36 and 37 associated therewith provides an arrangement which exhibits stiffness in the vertical direction and flexibility in the horizontal plane. Also, the stabilizing link 58 and the resilient elements 36 and 37 associated therewith provides an arrangement which exhibits stiffness in a horizontal direction and flexibility in the vertical plane.

The foregoing described propulsion unit arrangement therefore provides for isolation of the traction motor from the shocks and vibrations of the vehicle axle while at the same time, allowing for a solid coupling of the gear unit to the vehicle axle. Also, by suitable selection of characteristics of the resilient elements 36 and 37, the system is readily adaptable to adjustment (tuning) to dynamic conditions. All resilient elements of the system are readily accessible and removable individually without disturbing the propulsion unit assembly. Also, the traction motor can be readily removed for repair or replacement and, since it is entirely separate from the gear unit itself, removal of the motor can be accomplished without danger of contamination of the gear unit. Moreover, removal of the traction motor can be accomplished without in any way disturbing the torque rod connection between the gear unit and the vehicle frame. Since the flexible coupling means 30 is disposed exterior of the gear housing wear particles therefrom can not enter the lubrication system of the gear unit.

What I claim as new and desire to secure by Letters Patent of the United States is:

1. A propulsion unit for an electrically propelled vehicle having an underframe and wheel and axle assemblies mounted therein, the combination comprising:
   (a) a gear drive unit of the axle drive type wherein a gear housing adapted to surround an axle of said vehicle contains gearing through which driving power applied to said gearing is solidly coupled to said axle;
   (b) an electric traction motor having its output shaft coupled to the gearing of said gear drive unit;
   (c) resilient means interposed intermediate one end of said traction motor frame and said gear housing operative to resiliently mount said motor frame to said gear housing;
   (d) first linkage means resiliently connectable at one end to said gear unit and resiliently connectable at the other end to said underframe and being operative when so connected to take the torque reaction at the vehicle axle; and
   (e) second linkage means resiliently connectable between the underframe and the end of said traction motor remote from said gear drive unit operative to provide components of resilient support for said traction motor in directions both horizontally and vertically with respect to said underframe.

2. The propulsion unit of claim 1 wherein said second linkage means includes first and second links positioned vertically and horizontally, respectively, with respect to said underframe, said first link being connectable at one end through resilient elements to said underframe and at the other end through resilient elements to said traction motor and said second link being connectable at one end through resilient elements to said underframe and at the other end through resilient elements to said traction motor.

3. The propulsion unit of claim 2 wherein said one end of the frame of said traction motor is mounted to said gear housing through a plurality of resilient bushings, said bushings exhibiting stiffness in the radial direction to take the torque reaction of the motor and flexible in the axial direction (with respect to the output shaft of the motor) to permit movement.

4. The propulsion unit of claim 1 wherein said one end of the frame of said traction motor is mounted to said gear housing through a plurality of resilient bushings operative to take the torque reaction of said traction motor and provide a resilient mounting and support between the traction motor and the gear housing.

5. A propulsion unit for an electrically propelled vehicle having an underframe and wheel and axle assemblies mounted therein, the combination comprising:
   (a) a gear drive unit of the axle drive type wherein a gear housing adapted to surround an axle of said vehicle contains gearing through which driving power is solidly coupled to the axle;
   (b) an electric traction motor having an output shaft and a frame having an inboard and an outboard end;
   (c) resilient means interposed intermediate the inboard end of said traction motor frame and the housing of said gear drive unit operative to resiliently mount said motor frame to said gear housing, the output shaft of said traction motor being coupled to the gearing of said gear drive unit so that said gearing is arranged and adapted to be driven by the output shaft of said traction motor;
   (d) first linkage means resiliently connectable between the gear drive unit near the connection of said traction motor thereto and said underframe, said linkage means being operative when connected to take the torque reaction of the vehicle axle;
   (e) second linkage means resiliently connectable vertically between the outboard end of said traction motor and said underframe; and
   (f) third linkage means resiliently connectable horizontally between the outboard end of said traction motor and said underframe.

6. A propulsion unit for an electrically propelled vehicle comprising:
   (a) a gear drive unit of the axle drive type having a first portion of the housing thereof adapted to surround an axle of said vehicle and having contained therein gearing through which driving power coupled to said gearing is solidly coupled to the axle, said gear drive unit having a second portion thereof terminating in an annular flange having a plurality of mounting openings circumferentially spaced thereabout;
   (b) a plurality of resilient bushing means one positioned within each of said mounting openings in said annular flange with a portion extending laterally beyond the plane of said flange;

(c) an electric traction motor having a frame terminating in a mounting means adapted for coupling to said annular flange and including a like plurality of mounting openings matching the mounting openings in said annular flange, the extending portions of the resilient bushings in the annular flange of said gear drive unit butting against the mounting means of said traction motor to provide a resilient mounting means between said traction motor and said gear drive unit;

(d) coupling means for coupling the output shaft of said traction motor to the gearing of said gear drive unit so that said gearing is driven by said traction motor and the driving power thereof is imparted to said axle;

(e) first linkage means resiliently connectable at one end to the second portion of said gear drive unit and resiliently connectable at the other end to an extending portion of the vehicle frame and being operative when connected to take the torque reaction at the vehicle axle; and (f) second linkage means resiliently connectable between the underframe and the end of said traction motor remote from said gear drive unit operative to provide components of resilient support for said traction motor in directions both horizontally and vertically with respect to said underframe.

7. In a propulsion unit of the type including an electric traction motor combined with an axle type gear drive unit having a housing positionable about an axle of a vehicle and containing gearing through which driving power coupled to the gearing from the traction motor is imparted to the axle, a suspension arrangement for said propulsion unit comprising:

(a) means for arranging the gearing of said gear drive unit to provide for the solid coupling of driving power to said axle;

(b) resilient means interposed intermediate one end of said traction motor and said gear housing for resiliently mounting said traction motor to said gear drive unit;

(c) first linkage means resiliently connectable at one end to said gear drive unit and at the other end to a portion of the underframe of said vehicle and being operative when so connected to take the torque reaction at the vehicle wheels; and (d) second linkage means resiliently connectable between the underframe of the vehicle and the end of the traction motor remote from said gear drive unit operative to provide components of resilient support for said traction motor in directions both horizontally and vertically with respect to the vehicle underframe, said second linkage means including a first rigid link connectable horizontally between the underframe and the traction motor and a second rigid link connectable vertically between the underframe and the traction motor.

8. A propulsion unit for an electrically propelled vehicle having a frame comprising:

(a) a gear drive unit of the axle drive type wherein a gear housing adapted to surround the vehicle axle contains gearing through which driving power may be solidly coupled to the axle;

(b) an electric traction motor having a frame and an output shaft;

(c) resilient means interposed intermediate one end of said traction motor and said gear housing for resiliently mounting one end of said traction motor frame to said gear housing;

(d) means coupling the output shaft of said traction motor to the gearing of said gear drive unit so that said gearing is arranged and adapted to be driven by the output shaft;

(e) first resilient linkage means connected between the gear housing and the frame of said vehicle for taking the torque reaction on the vehicle axle; and (f) second resilient linkage means connected between the frame of said traction motor at a location thereof remote from said gear drive unit and said vehicle frame for resiliently supporting said traction motor, said first and second linkage means being positioned vertically with respect to the plane of the vehicle frame.

References Cited

UNITED STATES PATENTS

| | | | |
|---|---|---|---|
| 810,674 | 1/1906 | Rae | 180—59 |
| 1,804,351 | 5/1931 | Latshaw | 248—8 X |
| 2,084,891 | 6/1937 | Cease | 105—133 X |
| 2,888,999 | 6/1959 | Maruhn | 180—54 |
| 3,152,557 | 10/1964 | Mueller | 105—108 |
| 3,152,588 | 10/1964 | Mueller | 105—133 |

BENJAMIN HERSH, Primary Examiner

MILTON L. SMITH, Assistant Examiner

U.S. Cl. X.R.

105—108, 136, 139; 248—8